US012583784B2

(12) United States Patent　　(10) Patent No.: US 12,583,784 B2
Yokota　　(45) Date of Patent: Mar. 24, 2026

(54) Li2O—Al2O3—SiO2-BASED CRYSTALLIZED GLASS

(71) Applicant: NIPPON ELECTRIC GLASS CO., LTD., Otsu (JP)

(72) Inventor: Yuki Yokota, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 789 days.

(21) Appl. No.: 17/291,636

(22) PCT Filed: Oct. 11, 2019

(86) PCT No.: PCT/JP2019/040301
§ 371 (c)(1),
(2) Date: May 6, 2021

(87) PCT Pub. No.: WO2020/100490
PCT Pub. Date: May 22, 2020

(65) Prior Publication Data
US 2021/0403370 A1　　Dec. 30, 2021

(30) Foreign Application Priority Data

Nov. 12, 2018　(JP) ................................. 2018-211964
Mar. 6, 2019　(JP) ................................. 2019-040399

(51) Int. Cl.
*C03C 3/097*　　(2006.01)

(52) U.S. Cl.
CPC ................................... *C03C 3/097* (2013.01)

(58) Field of Classification Search
CPC ............................ C03C 3/097; C03C 10/0027
See application file for complete search history.

(56) References Cited

U.S. PATENT DOCUMENTS

| | | | |
|---|---|---|---|
| 3,843,551 A | 10/1974 | Muller et al. |
| 3,977,886 A | 8/1976 | Muller |
| 4,017,454 A | 4/1977 | Muller |
| 6,387,509 B1 | 5/2002 | Goto et al. |
| 2010/0167091 A1 | 7/2010 | Tachiwana et al. |
| 2010/0167903 A1 | 7/2010 | Comte et al. |
| 2011/0086241 A1 | 4/2011 | Hachitani et al. |
| 2012/0021892 A1 | 1/2012 | Tachiwana et al. |
| 2012/0328907 A1 | 12/2012 | Tachiwana et al. |

| | | | |
|---|---|---|---|
| 2013/0047672 A1 | 2/2013 | Comte et al. |
| 2014/0087935 A1 | 3/2014 | Muguruma |
| 2014/0302346 A1 | 10/2014 | Tachiwana et al. |
| 2015/0166402 A1 | 6/2015 | Muguruma et al. |
| 2015/0325725 A1 | 11/2015 | Muguruma et al. |
| 2016/0031187 A1* | 2/2016 | Zhang ...................... C23D 5/00 |
| | | | 156/60 |
| 2016/0168018 A1 | 6/2016 | Gabel et al. |
| 2019/0062201 A1* | 2/2019 | Weiss ...................... C03C 3/097 |
| 2020/0407268 A1 | 12/2020 | Mitchell |
| 2021/0024406 A1* | 1/2021 | Christiansen .......... A47G 19/00 |

FOREIGN PATENT DOCUMENTS

| | | |
|---|---|---|
| CN | 101657390 A | 2/2010 |
| CN | 102143922 A | 8/2011 |
| CN | 102432171 A | 5/2012 |
| CN | 103492332 A | 1/2014 |
| CN | 103987672 A | 8/2014 |
| CN | 104024170 A | 9/2014 |
| EP | 2 351 716 A1 | 8/2011 |
| EP | 3 990 406 A1 | 5/2022 |
| JP | S39-021049 B | 9/1964 |
| JP | S40-020182 B | 9/1965 |
| JP | H01-308845 A | 12/1989 |
| JP | H11-228180 A | 8/1999 |
| JP | H11-228181 A | 8/1999 |
| JP | H11-314939 A | 11/1999 |
| JP | 2010-510951 A | 4/2010 |
| JP | 2016-531075 A | 10/2016 |
| WO | WO-2008-065166 A1 | 6/2008 |
| WO | WO-2011-106489 A2 | 9/2011 |
| WO | WO-2020/264229 A1 | 12/2020 |

OTHER PUBLICATIONS

Japanese Office Action issued Nov. 22, 2023 in Application No. 2020-556711.
Chinese Office Action issued Mar. 22, 2023 in Application No. 201980072074.7.
Second Chinese Office Action issued Nov. 16, 2022 in Chinese Patent Application No. 201980072074.7 with English-language translation.
Japanese Office Action issued Aug. 24, 2023 in Application No. 2020-556711.
International Search Report dated Nov. 12, 2019 for PCT/JP2019/040301.
Written Opinion dated Nov. 12, 2019 for PCT/JP2019/040301 (including partial English translation).

(Continued)

*Primary Examiner* — Cameron K Miller
(74) *Attorney, Agent, or Firm* — Faegre Drinker Biddle & Reath LLP

(57) ABSTRACT

A Li$_2$O—Al$_2$O$_3$—SiO$_2$-based crystallized glass contains: in a mass basis, SnO$_2$: 0% to 5%; and HfO$_2$+Ta$_2$O$_5$: 0.01% to 10%.

15 Claims, No Drawings

(56)                    References Cited

OTHER PUBLICATIONS

The First Office Action issued Jun. 15, 2022 in Chinese Patent Application No. 201980072074.7 (8 pages) with an English translation (8 pages).
The Extended European Search Report issued Jul. 11, 2022 in European Patent Application No. 19884251.0.
Japanese Office Action issued Feb. 14, 2024 in Application No. 2020-556711.
Lothar Wondracz et al., "Transparent Hafnia-Containing β-Quartz Glass Ceramics: Nucleation and Crystallization Behavior," Journal of the American Ceramic Society, 2008, vol. 91, No. 6, p. 1945-1951.
European Communication Pursuant to Article 94(3) EPC issued Nov. 27, 2024 in Application No. 19 884 251.0.
Chinese Office Action issued Jan. 30, 2026 in Application No. 201980072074.7.
《先进陶瓷工艺学》，刘维良主编，第587 页，武汉理工大学出版社，2005 年08 月第一次印刷, translated using Google Translate as "Advanced Ceramic Processing Technology," edited by Liu Weiliang, p. 587, Wuhan University of Technology Press, first printing Aug. 2004.

* cited by examiner

Li2O—Al2O3—SiO2-BASED CRYSTALLIZED GLASS

TECHNICAL FIELD

The present invention relates to a $Li_2O$—$Al_2O_3$—$SiO_2$-based crystallized glass. Specifically, the present invention relates to a $Li_2O$—$Al_2O_3$—$SiO_2$-based crystallized glass suitable as a material for, for example, front windows of oil stoves or wood stoves, substrates for high-tech products such as substrates for color filters and image sensors, setters for firing electronic components, light diffusers, core tubes for semiconductor manufacturing, semiconductor manufacturing masks, optical lenses, dimensional measurement members, communication members, building members, chemical reaction containers, top plates for electromagnetic cooking, and window glass for fire doors.

BACKGROUND ART

In the related art, a $Li_2O$—$Al_2O_3$—$SiO_2$-based crystallized glass is used as a material for, for example, front windows of oil stoves or wood stoves, substrates for high-tech products such as substrates for color filters and image sensors, setters for firing electronic components, top plates for electromagnetic cooking, and window glass for fire doors. For example, Patent Literatures 1 to 3 disclose a $Li_2O$—$Al_2O_3$—$SiO_2$-based crystallized glass obtained by precipitating a $Li_2O$—$Al_2O_3$—$SiO_2$-based crystal such as a β-quartz solid solution ($Li_2O$—$Al_2O_3 \cdot nSiO_2$ [where $2 \leq n \leq 4$]) and a β-spodumene solid solution ($Li_2O \cdot Al_2O_3 \cdot nSiO_2$ [where $n \geq 4$]) as a main crystal.

The $Li_2O$—$Al_2O_3$—$SiO_2$-based crystallized glass has excellent thermal properties because of having a low thermal expansion coefficient and high mechanical strength. When heat treatment conditions in a crystallization step are appropriately adjusted, it is possible to control the type of precipitated crystals, and a transparent crystallized glass (β-quartz solid solution is precipitated) can be easily produced.

However, when manufacturing this type of crystallized glass, melting at a high temperature higher than 1,400° C. is required. Therefore, as a fining agent to be added to a glass batch, $As_2O_3$ and $Sb_2O_3$, which can generate a large amount of fining gas in the melting at a high temperature, are used. However, $As_2O_3$ and $Sb_2O_3$ are highly toxic and may pollute the environment during a glass manufacturing step or a waste glass treatment.

Therefore, $SnO_2$ and Cl have been proposed as alternative fining agents for $As_2O_3$ and $Sb_2O_3$ (see, for example, Patent Literatures 4 and 5). However, Cl easily corrodes a mold and a metal roll during glass molding, and as a result, the surface quality of the glass may be deteriorated. From such a viewpoint, it is preferable to use $SnO_2$ as the fining agent, which does not cause the above problems.

CITATION LIST

Patent Literature

Patent Literature 1: JP-B-S39-21049
Patent Literature 2: JP-B-S40-20182
Patent Literature 3: JP-A-H01-308845
Patent Literature 4: JP-A-H11-228180
Patent Literature 5: JP-A-H11-228181

SUMMARY OF INVENTION

Technical Problem

As described above, $SnO_2$ is a preferred component from the viewpoint of not polluting the environment. However, as described in Patent Literatures 4 and 5, since $SnO_2$ has an effect of strengthening the coloring caused by $TiO_2$, $Fe_2O_3$, etc., there is a problem that the yellowish color of the transparent crystallized glass is strengthened, which is not preferred in appearance.

An object of the present invention is to provide a $Li_2O$—$Al_2O_3$—$SiO_2$-based crystallized glass in which yellow coloring caused by $TiO_2$, $Fe_2O_3$, etc. is prevented.

Solution to Problem

When improving the yellow coloring of the transparent crystallized glass caused by $TiO_2$, $Fe_2O_3$, etc., it is sufficient to reduce the contents of these components. However, in particular, when the content of $TiO_2$ is reduced, the optimum firing temperature range is narrowed, and the amount of crystal nuclei produced tends to be reduced. As a result, the number of coarse crystals increases, the crystallized glass becomes cloudy, and the transparency tends to be impaired. However, it has been found that the shortage of the amount of crystal nuclei produced due to the reduction of the content of $TiO_2$ can be compensated by containing either $HfO_2$ or $Ta_2O_5$, and since the transparent crystallized glass containing either $HfO_2$ or $Ta_2O_5$ emits blue light by ultraviolet light, it is possible to prevent yellow coloring.

A $Li_2O$—$Al_2O_3$—$SiO_2$-based crystallized glass according to the present invention contains: in a mass basis, $SnO_2$: 0% to 5%; and $HfO_2 + Ta_2O_5$: 0.01% to 10%. Accordingly, it is easy to obtain a $Li_2O$—$Al_2O_3$—$SiO_2$-based crystallized glass in which coloring of the glass and precipitation of coarse crystals are prevented and which has excellent transparency. Here, the expression "$HfO_2 + Ta_2O_5$" means the total amount of the contents of $HfO_2$ and $Ta_2O_5$.

A $Li_2O$—$Al_2O_3$—$SiO_2$-based crystallized glass according to the present invention preferably contains: in a mass basis, $SiO_2$: 40% to 90%; $Al_2O_3$: 5% to 30%; $Li_2O$: 1% to 10%; $SnO_2$: 0.01% to 5%; and $HfO_2 + Ta_2O_5$: 0.01% to 10%.

A $Li_2O$—$Al_2O_3$—$SiO_2$-based crystallized glass according to the present invention preferably contains: in a mass basis, $SiO_2$: 40% to 90%; $Al_2O_3$: 5% to 30%; $Li_2O$: 1% to 10%; $SnO_2$: 0.01% to 5%; and $HfO_2 + Ta_2O_5$: 0.05% to 10%.

The $Li_2O$—$Al_2O_3$—$SiO_2$-based crystallized glass according to the present invention preferably further contains: in a mass basis, $Na_2O$: 0% to 10%; $K_2O$: 0% to 10%; MgO: 0% to 10%; CaO: 0% to 10%; SrO: 0% to 10%; BaO: 0% to 10%; ZnO: 0% to 10%; $P_2O_5$: 0% to 5%; $TiO_2$: 0% to 2%, and $ZrO_2$: 0% to 10%.

The $Li_2O$—$Al_2O_3$—$SiO_2$-based crystallized glass according to the present invention preferably has a colorless and transparent appearance.

The $Li_2O$—$Al_2O_3$—$SiO_2$-based crystallized glass according to the present invention preferably has a transmittance of 10% or more at a thickness of 3 mm and a wavelength of 300 nm. Accordingly, the $Li_2O$—$Al_2O_3$—$SiO_2$-based crystallized glass can be suitably used for various applications that require ultraviolet transparency.

In the $Li_2O$—$Al_2O_3$—$SiO_2$-based crystallized glass according to the present invention, a β-quartz solid solution is preferably precipitated as a main crystal. Accordingly, a crystallized glass having a low thermal expansion coefficient can be easily obtained.

In the $Li_2O$—$Al_2O_3$—$SiO_2$-based crystallized glass according to the present invention, a thermal expansion coefficient thereof at 30° C. to 380° C. is preferably 20× $10^{-7}/°$ C. or less. Accordingly, the $Li_2O$—$Al_2O_3$—$SiO_2$-based crystallized glass can be suitably used for various applications that require low expansibility.

In the $Li_2O$—$Al_2O_3$—$SiO_2$-based crystallized glass according to the present invention, a thermal expansion coefficient thereof at 30° C. to 750° C. is preferably 25× $10^{-7}/°$ C. or less. Accordingly, the $Li_2O$—$Al_2O_3$—$SiO_2$-based crystallized glass can be suitably used for various applications that require low expansibility at a wider temperature range.

A $Li_2O$—$Al_2O_3$—$SiO_2$-based crystallizable glass according to the present invention contains: in a mass basis, $SnO_2$: 0% to 5%; and $HfO_2+Ta_2O_5$: 0.01% to 10%.

Advantageous Effects of Invention

According to the present invention, it is possible to provide a $Li_2O$—$Al_2O_3$—$SiO_2$-based crystallized glass in which yellow coloring caused by $TiO_2$, $Fe_2O_3$, etc. is prevented.

DESCRIPTION OF EMBODIMENTS

A $Li_2O$—$Al_2O_3$—$SiO_2$-based crystallized glass according to the present invention contains, in a mass basis, $SnO_2$: 0% to 5% and $HfO_2+Ta_2O_5$: 0.01% to 10%, and preferably contains, in a mass basis, $SiO_2$: 40% to 90%, $Al_2O_3$: 5% to 30%, $Li_2O$: 1% to 10%, $SnO_2$: 0.01% to 5%, and $HfO_2+Ta_2O_5$: 0.01% to 10%. The reasons for limiting the glass composition as described above are shown below. In the following description of the content of each component, "%" means "mass %" unless otherwise specified.

$SiO_2$ is a component that forms a glass skeleton and constitutes a $Li_2O$—$Al_2O_3$—$SiO_2$-based crystal. The content of $SiO_2$ is preferably 40% to 90%, 50% to 85%, 52% to 83%, 55% to 80%, 55% to 75%, 55% 73%, 55% to 71%, 56% to 70%, 57% to 70%, 58% to 70%, 59% to 70%, and particularly preferably 60% to 70%. When the content of $SiO_2$ is too small, the thermal expansion coefficient tends to be high, and it is difficult to obtain a crystallized glass having excellent thermal shock resistance. In addition, the chemical durability tends to be lowered. On the other hand, when the content of $SiO_2$ is too large, the meltability of the glass is lowered, the viscosity of the glass melt is increased, it is difficult to fine the glass, the molding of the glass is difficult, and the productivity tends to be lowered.

$Al_2O_3$ is a component that forms a glass skeleton and constitutes a $Li_2O$—$Al_2O_3$—$SiO_2$-based crystal. The content of $Al_2O_3$ is preferably 5% to 30%, 7% to 30%, 8% to 29%, 10% to 28%, 13% to 27%, 15% to 26%, 16% to 26%, 17% to 25%, 17% to 24%, 18% to 24%, 19% to 24%, and particularly preferably 20% to 23%. When the content of $Al_2O_3$ is too small, the thermal expansion coefficient tends to be high, and it is difficult to obtain a crystallized glass having excellent thermal shock resistance. In addition, the chemical durability tends to be lowered. On the other hand, when the content of $Al_2O_3$ is too large, the meltability of the glass is lowered, the viscosity of the glass melt is increased, it is difficult to fine the glass, the molding of the glass is difficult, and the productivity tends to be lowered. In addition, mullite crystals tend to precipitate, the glass tends to be devitrified, and the glass is easily broken.

$Li_2O$ is a component that constitutes a $Li_2O$—$Al_2O_3$—$SiO_2$-based crystal, and is a component that has a great influence on crystallinity and lowers the viscosity of the glass to improve the meltability and formability of the glass. The content of $Li_2O$ is preferably 1% to 10%, 2% to 10%, 2% to 9%, 2% to 8%, 2% to 7%, 2.5% to 6%, 2.5% to 5%, 3% to 4.5%, and particularly preferably 3% to 4%. When the content of $Li_2O$ is too small, mullite crystals tend to precipitate and the glass tends to be devitrified. In addition, when crystallizing the glass, a $Li_2O$—$Al_2O_3$—$SiO_2$-based crystal is less likely to precipitate, and it is difficult to obtain a crystallized glass having excellent thermal shock resistance. Further, the meltability of the glass is lowered, the viscosity of the glass melt is increased, it is difficult to fine the glass, the molding of the glass is difficult, and the productivity tends to be lowered. On the other hand, when the content of $Li_2O$ is too large, the crystallinity becomes too strong, the glass tends to be devitrified, and the glass is easily broken.

$SnO_2$ is a component that acts as a fining agent. When $SnO_2$ is used as a fining agent, the glass can be sufficiently fined without using a highly toxic fining agent $As_2O_3$ or $Sb_2O_3$. $SnO_2$ is also a component that serves as a nucleating agent for precipitating a crystal in a crystallization step. On the other hand, $SnO_2$ is also a component that remarkably strengthens the coloring of the glass when contained in a large amount. The content of $SnO_2$ is preferably 0% to 5%, 0.01% to 5%, 0.01% to 4%, 0.02% to 3%, 0.03% to 2.5%, 0.05% to 3%, 0.05% to 2.5%, 0.05% to 2%, 0.05% to 1.9%, 0.05% to 1.8%, 0.05% to 1.7%, 0.05% to 1.6%, 0.05% to 1.5%, 0.1% to 1%, 0.1% to 0.5%, 0.1% to 0.4%, 0.1% to 0.35%, and particularly preferably 0.15% to 0.25%. When the content of $SnO_2$ is too small, it is difficult to fine the glass, and the productivity tends to be lowered. On the other hand, when the content of $SnO_2$ is too large, the coloring of the glass is increased.

$HfO_2$ and $Ta_2O_5$ are components that serve as a nucleating agent for precipitating a crystal in the crystallization step. $HfO_2$ and $Ta_2O_5$ are also components that emit blue light by ultraviolet light, which serve as a complementary color and prevent yellow coloring. The content of $HfO_2+Ta_2O_5$ is preferably 0.01% to 10%, 0.02% to 10%, 0.03% to 10%, 0.04% to 10%, 0.05% to 10%, 0.06% to 10%, 0.07% to 10%, 0.08% to 10%, 0.09% to 9%, 0.1% to 8%, 0.11% to 7%, 0.12% to 6%, 0.5% to 5%, 1% to 4%, 2% to 3.5%, and particularly preferably 3% to 3.5%. When the content of $HfO_2+Ta_2O_5$ is too small, crystal nuclei may not be sufficiently formed, and coarse crystals may precipitate to cause the glass to become cloudy or broken. In addition, the coloring of the glass tends to increase. On the other hand, when the content of $HfO_2+Ta_2O_5$ is too large, the glass tends to be devitrified in melting, making it difficult to mold the glass and reducing the productivity. The content of each component, i.e., $HfO_2$ and $Ta_2O_5$, is preferably 0.01% to 10%, 0.02% to 10%, 0.03% to 10%, 0.04% to 10%, 0.05% to 10%, 0.06% to 10%, 0.07% to 10%, 0.08% to 10%, 0.09% to 9%, 0.1% to 8%, 0.11% to 7%, 0.12% to 6%, 0.5% to 5%, 1% to 4%, 2% to 3.5%, and particularly preferably 3% to 3.5%. $HfO_2$ and $Ta_2O_5$ may be mixed as impurities.

The $Li_2O$—$Al_2O_3$—$SiO_2$-based crystallized glass according to the present invention may contain the following components in a glass composition, in addition to the above components.

$Na_2O$ is a component that solid-dissolves in a $Li_2O$—$Al_2O_3$—$SiO_2$-based crystal, and is a component that has a great influence on crystallinity and lowers the viscosity of the glass to improve the meltability and formability of the glass. The content of $Na_2O$ is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0% to 1%, and particularly preferably 0.1% to 0.8%. When the content of $Na_2O$ is too large, the crystallinity becomes too strong, the glass is easily devitrified, and the glass is easily broken.

$K_2O$ is a component that solid-dissolves in a $Li_2O$—$Al_2O_3$—$SiO_2$-based crystal, and is a component that has a great influence on crystallinity and lowers the viscosity of the glass to improve the meltability and formability of the glass. The content of $K_2O$ is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0% to 1%, and particularly preferably 0.1% to 0.8%. When the content of $K_2O$ is too large, the crystallinity becomes too strong, the glass is easily devitrified, and the glass is easily broken.

MgO is a component that solid-dissolves in a $Li_2O$—$Al_2O_3$—$SiO_2$-based crystal and increases the thermal expansion coefficient of the $Li_2O$—$Al_2O_3$—$SiO_2$-based crystal. The content of MgO is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0.1% to 2%, and particularly preferably 0.3% to 1.5%. When the content of MgO is too large, the crystallinity becomes too strong, the glass is easily devitrified, and the glass is easily broken. In addition, the thermal expansion coefficient tends to be too high.

CaO is a component that lowers the viscosity of the glass to improve the meltability and formability of the glass. The content of CaO is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0% to 2%, and particularly preferably 0% to 1%. When the content of CaO is too large, the glass is easily devitrified, and the glass is easily broken.

SrO is a component that lowers the viscosity of the glass to improve the meltability and formability of the glass. The content of SrO is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0% to 2%, and particularly preferably 0% to 1%. When the content of SrO is too large, the glass is easily devitrified, and the glass is easily broken.

BaO is a component that lowers the viscosity of the glass to improve the meltability and formability of the glass. The content of BaO is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0.1% to 2%, 0.5% to 1.8%, and particularly preferably 1% to 1.5%. When the content of BaO is too large, crystals containing Ba are precipitated, the glass is easily devitrified, and the glass is easily broken.

ZnO is a component that solid-dissolves in a $Li_2O$—$Al_2O_3$—$SiO_2$-based crystal and has a great influence on crystallinity. The content of ZnO is preferably 0% to 10%, 0% to 9.5%, 0% to 9%, 0% to 8.5%, 0% to 8%, 0% to 7.5%, 0% to 7%, 0% to 6.5%, 0% to 6%, 0% to 5.5%, 0% to 5%, 0% to 4.5%, 0% to 4%, 0% to 3.5%, 0% to 3%, 0% to 2%, 0% to 1%, and particularly preferably 0% to 0.6%. When the content of ZnO is too large, the crystallinity becomes too strong, the glass is easily devitrified, and the glass is easily broken.

$P_2O_5$ is a component that prevents the precipitation of a coarse $ZrO_2$-based crystal. The content of $P_2O_5$ is preferably 0% to 5%, 0% to 4.5%, 0% to 4%, 0% to 3.5%, 0% to 3%, 0% to 2.5%, 0% to 2%, 0.5% to 2%, 1% to 2%, and particularly preferably 1.2% to 1.8%. When the content of $P_2O_5$ is too large, the precipitation amount of the $Li_2O$—$Al_2O_3$—$SiO_2$-based crystal tends to be small, and the thermal expansion coefficient tends to be high.

$TiO_2$ is a component that serves as a nucleating agent for precipitating a crystal in the crystallization step. On the other hand, $TiO_2$ is also a component that remarkably strengthens the coloring of the glass when contained in a large amount, particularly a component that remarkably strengthens the coloring by interacting with $SnO_2$. In addition, when Ti remains in the residual glass phase, LMCT transition may occur from the valence band of the $SiO_2$ skeleton to the conduction band of tetravalent Ti of the residual glass phase. Further, in the trivalent Ti of the residual glass phase, d-d transition occurs, which is involved in the coloring of the crystallized glass. Further, it is known that when Ti and Fe coexist, ilmenite ($FeTiO_3$)-like coloring is exhibited, and when Ti and Sn coexist, the yellowish color is strengthened. Therefore, the content of $TiO_2$ is preferably 0% to 2%, 0% to 1%, 0% to 0.5%, 0% to 0.4%, 0% to 0.3%, 0% to 0.2%, and particularly preferably 0% to 0.1%. However, since $TiO_2$ is mixed as an impurity, when it is attempted to completely remove $TiO_2$, the raw material batch is expensive and the manufacturing cost tends to increase. In order to prevent the increase in manufacturing cost, the lower limit of the content of $TiO_2$ is preferably 0.0003% or more, 0.0005% or more, 0.001% or more, 0.005% or more, 0.01% or more, and particularly preferably 0.02% or more.

$ZrO_2$ is a nucleation component for precipitating a crystal in the crystallization step. The content of $ZrO_2$ is preferably 0% to 10%, 0% to 5%, 0.1% to 4%, 0.2% to 4%, 0.3% to 4%, 0.4% to 4%, 0.5% to 4%, 0.5% to 3.9%, 0.5% to 3.8%, 0.5% to 3.7%, 0.5% to 3.6%, 0.5% to 3.5%, 0.5% to 3.4%, 0.5% to 3.3%, 0.5% to 3.2%, 0.6% to 3.2%, 0.7% to 3.2%, 0.8% to 3.2%, 0.9% to 3.2%, 1% to 3.2%, 1.1% to 3.2%, 1.2% to 3.2%, 1.3% to 3.2%, 1.4% to 3.2%, 1.5% to 3.2%, 1.6% to 3.2%, 1.7% to 3.2%, 1.7% to 3%, 1.7% to 2.8%, and particularly preferably 2% to 2.5%. When the content of $ZrO_2$ is too large, coarse $ZrO_2$ crystals are precipitated, the glass is easily devitrified, and the glass is easily broken.

$Fe_2O_3$ is a component that strengthens the coloring of the glass, particularly a component that remarkably strengthens the coloring by interacting with $SnO_2$. The content of $Fe_2O_3$ is preferably 0% to 0.05%, 0% to 0.03%, 0% to 0.01%, 0% to 0.005%, 0% to 0.004%, 0% to 0.003%, and particularly preferably 0% to 0.002%. However, since $Fe_2O_3$ is mixed as an impurity, when it is attempted to completely remove $Fe_2O_3$, the raw material batch is expensive and the manufacturing cost tends to increase. In order to prevent the increase in manufacturing cost, the lower limit of the content of $Fe_2O_3$ is preferably 0.0001% or more, 0.0002% or more, 0.0003% or more, 0.0005% or more, and particularly preferably 0.001% or more.

$As_2O_3$ and $Sb_2O_3$ are highly toxic and may pollute the environment during a glass manufacturing step or a waste glass treatment. Therefore, it is preferable that the $Li_2O$—$Al_2O_3$—$SiO_2$-based crystallized glass according to the present invention does not substantially contain these components (specifically, less than 0.1 mass %).

The $Li_2O$—$Al_2O_3$—$SiO_2$-based crystallized glass according to the present invention may contain a trace component such as $H_2$, $CO_2$, CO, $H_2O$, He, Ne, Ar, or $N_2$ up to 0.1% respectively, in addition to the above components. In addition, the glass may contain up to 10 ppm of a noble metal element such as Ag, Au, Pd or Ir respectively.

Further, the $Li_2O$—$Al_2O_3$—$SiO_2$-based crystallized glass according to the present invention may contain Pt, Rh, $B_2O_3$, $Cr_2O_3$, $SO_3$, MnO, $CeO_2$, $Cl_2$, $Y_2O_3$, MoO3, $La_2O_3$, $WO_3$, $Nd_2O_3$, $Nb_2O_5$, $Sc_2O_3$, $V_2O_5$, $RfO_2$ and the like in a total amount of up to 10% as long as there is no adverse influence on coloring.

The $Li_2O$—$Al_2O_3$—$SiO_2$-based crystallized glass according to the present invention having the above composition tends to be colorless and transparent in appearance.

The $Li_2O$—$Al_2O_3$—$SiO_2$-based crystallized glass according to the present invention preferably has a transmittance of 10% or more, 20% or more, and particularly preferably 30% or more at a thickness of 3 mm and a wavelength of 300 nm. When the transmittance is too low, the yellow coloring of the glass becomes too strong and the transparency of the glass is lowered. When either $HfO_2$ or $Ta_2O_5$ is used as the nucleating agent, the glass emits blue light and the yellow coloring can be prevented, so that the transmittance can be easily increased.

In the $Li_2O$—$Al_2O_3$—$SiO_2$-based crystallized glass according to the present invention, a β-quartz solid solution is preferably precipitated as a main crystal. If the β-quartz solid solution is precipitated as the main crystal, the crystallized glass easily transmits visible light and the transparency is easily increased. In addition, it is easy to bring the thermal expansion coefficient of the glass close to zero. When either $HfO_2$ or $Ta_2O_5$ is used as the nucleating agent, the amount of the β-quartz solid solution precipitated can be controlled, and it is easier to bring the thermal expansion coefficient of the glass close to zero. A white opaque crystallized glass in which a β-spodumene solid solution is precipitated as the main crystal may be used.

In the $Li_2O$—$Al_2O_3$—$SiO_2$-based crystallized glass according to the present invention, the thermal expansion coefficient at 30° C. to 380° C. is preferably $20 \times 10^{-7}$/° C. or less, $18 \times 10^{-7}$/° C. or less, $15 \times 10^{-7}$/° C. or less, $14 \times 10^{-7}$/° C. or less, $13 \times 10^{-7}$/° C. or less, $12 \times 10^{-7}$/° C. or less, $11 \times 10^{-7}$/° C. or less, $10 \times 10^{-7}$/° C. or less, $9 \times 10^{-7}$/° C. or less, $8 \times 10^{-7}$/° C. or less, $7 \times 10^{-7}$/° C. or less, $6 \times 10^{-7}$/° C. or less, $5 \times 10^{-7}$/° C. or less, $4 \times 10^{-7}$/° C. or less, $3 \times 10^{-7}$/° C. or less, and particularly preferably $2 \times 10^{-7}$/° C. or less. The lower limit of the thermal expansion coefficient at 30° C. to 380° C. is not particularly limited, and is practically $-30 \times 10^{-7}$/° C. or more. When dimensional stability and/or thermal shock resistance is specifically required, the thermal expansion coefficient at 30° C. to 380° C. is preferably $-5 \times 10^{-7}$/° C. to $5 \times 10^{-7}$/° C., $-3 \times 10^{-7}$/° C. to $3 \times 10^{-7}$/° C., $-2.5 \times 10^{-7}$/° C. to $2.5 \times 10^{-7}$/° C., $-2 \times 10^{-7}$/° C. to $2 \times 10^{-7}$/° C., $-1.5 \times 10^{-7}$/° C. to $1.5 \times 10^{-7}$/° C., $-1 \times 10^{-7}$/° C. to $1 \times 10^{-7}$/° C., and particularly preferably $-0.5 \times 10^{-7}$/° C. to $0.5 \times 10^{-7}$/° C.

In the $Li_2O$—$Al_2O_3$—$SiO_2$-based crystallized glass according to the present invention, the thermal expansion coefficient at 30° C. to 750° C. is preferably $25 \times 10^{-7}$/° C. or less, $23 \times 10^{-7}$/° C. or less, $21 \times 10^{-7}$/° C. or less, $20 \times 10^{-7}$/° C. or less, $18 \times 10^{-7}$/° C. or less, $16 \times 10^{-7}$/° C. or less, $14 \times 10^{-7}$/° C. or less, $12 \times 10^{-7}$/° C. or less, $10 \times 10^{-7}$/° C. or less, $9 \times 10^{-7}$/° C. or less, $8 \times 10^{-7}$/° C. or less, $7 \times 10^{-7}$/° C. or less, $6 \times 10^{-7}$/° C. or less, $5 \times 10^{-7}$/° C. or less, $4 \times 10^{-7}$/° C. or less, and particularly preferably $3 \times 10^{-7}$/° C. or less. When dimensional stability and/or thermal shock resistance is specifically required, the thermal expansion coefficient at 30° C. to 750° C. is preferably $-15 \times 10^{-7}$/° C. to $15 \times 10^{-7}$/° C., $-12 \times 10^{-7}$/° C. to $12 \times 10^{-7}$/° C., $-10 \times 10^{-7}$/° C. to $10 \times 10^{-7}$/° C., $-8 \times 10^{-7}$/° C. to $8 \times 10^{-7}$/° C., $-6 \times 10^{-7}$/° C. to $6 \times 10^{-7}$/° C., $-5 \times 10^{-7}$/° C. to $5 \times 10^{-7}$/° C., $-4.5 \times 10^{-7}$/° C. to $4.5 \times 10^{-7}$/° C., $-4 \times 10^{-7}$/° C. to $4 \times 10^{-7}$/° C., $-3.5 \times 10^{-7}$/° C. to $3.5 \times 10^{-7}$/° C., $-3 \times 10^{-7}$/° C. to $3 \times 10^{-7}$/° C., $-2.5 \times 10^{-7}$/° C. to $2.5 \times 10^{-7}$/° C., $-2 \times 10^{-7}$/° C. to $2 \times 10^{-7}$/° C., $-1.5 \times 10^{-7}$/° C.

8 to $1.5 \times 10^{-7}$/° C., $-1 \times 10^{-7}$/° C. to $1 \times 10^{-7}$/° C., and particularly preferably $-0.5 \times 10^{-7}$/° C. to $0.5 \times 10^{-7}$/° C.

In the $Li_2O$—$Al_2O_3$—$SiO_2$-based crystallized glass according to the present invention, the Young modulus is preferably 60 GPa to 120 GPa, 70 GPa to 110 GPa, and particularly preferably 80 GPa to 100 GPa. When the Youngs modulus is too low or too high, the glass is easily broken.

In the $Li_2O$—$Al_2O_3$—$SiO_2$-based crystallized glass according to the present invention, the rigidity is preferably 25 GPa to 50 GPa, 27 GPa to 48 GPa, and particularly preferably 30 GPa to 45 GPa. When the rigidity is too low or too high, the glass is easily broken.

In the $Li_2O$—$Al_2O_3$—$SiO_2$-based crystallized glass according to the present invention, the Poissons ratio is preferably 0.35 or less, 0.3 or less, and particularly preferably 0.25 or less. When the Poissons ratio is too large, the glass is easily broken.

Next, a method for manufacturing the $Li_2O$—$Al_2O_3$—$SiO_2$-based crystallized glass according to the present invention will be described.

First, a raw material batch prepared so as to have a glass having the above composition is charged into a glass melting furnace, melted at 1,500° C. to 1,750° C., and then molded. When melting the glass, a flame melting method using a burner or the like, an electric melting method using electric heating, or the like may be used. It is also possible to melt by laser irradiation or by plasma.

Next, the obtained crystallizable glass (glass that can be crystallized) is subjected to a heat treatment to be crystallized. As crystallization conditions, first, nucleation is performed at 700° C. to 950° C. (preferably 750° C. to 900° C.) for 0.1 to 5 hours (preferably 1 to 3 hours), and then crystal growth is performed at 800° C. to 1,050° C. (preferably 800° C. to 1,000° C.) for 0.1 to 50 hours (preferably 0.2 to 10 hours). In this way, a transparent $Li_2O$—$Al_2O_3$—$SiO_2$-based crystallized glass in which the β-quartz solid solution crystal is precipitated as a main crystal can be obtained. Further, the heat treatment is performed at 950° C. to 1,200° C. for 0.5 to 5 hours to precipitate a β-spodumene solid solution crystal, and a white opaque LAS-based crystallized glass can be obtained.

EXAMPLES

Hereinafter, the present invention will be described based on Examples, but the present invention is not limited to the following Examples. Tables 1 to 4 show Examples (sample Nos. 1 to 9) and Comparative Examples (sample No. 10) of the present invention.

TABLE 1

| | | No. 1 | No. 2 | No. 3 |
|---|---|---|---|---|
| Composition [wt %] | $SiO_2$ | 63.4 | 62.8 | 63.4 |
| | $Al_2O_3$ | 21.5 | 21.3 | 21.4 |
| | $Li_2O$ | 3.6 | 3.5 | 3.5 |
| | $HfO_2$ | 5.1 | 0 | 5.0 |
| | $Ta_2O_5$ | 0 | 6.2 | 0 |
| | $Na_2O$ | 0.4 | 0.4 | 0.4 |
| | $K_2O$ | 0.3 | 0.3 | 0.3 |
| | MgO | 0.7 | 0.7 | 0.7 |
| | CaO | 0 | 0 | 0 |
| | SrO | 0 | 0 | 0 |
| | BaO | 1.2 | 1.2 | 1.2 |
| | $TiO_2$ | 0 | 0 | 0.5 |
| | $ZrO_2$ | 2.2 | 2.1 | 2.1 |
| | $P_2O_5$ | 1.4 | 1.3 | 1.3 |

TABLE 1-continued

|  | No. 1 | No. 2 | No. 3 |
|---|---|---|---|
| SnO$_2$ | 0.2 | 0.2 | 0.2 |
| Fe$_2$O$_3$ | 0.015 | 0.015 | 0.015 |
| Transmittance [%] at thickness of 3 mm and wavelength of 300 nm | 43 | 10 | Unmeasured |
| Precipitated crystal | β-quartz solid solution | β-quartz solid solution | β-quartz solid solution |
| Thermal expansion coefficient at 30° C. to 380° C. [×10$^{-7}$/° C.] | −0.2 | −0.4 | 0 |
| Thermal expansion coefficient at 30° C. to 750° C. [×10$^{-7}$/° C.] | 0.4 | 0.9 | 0.8 |
| Youngs modulus [GPa] | 92 | 93 | Unmeasured |
| Rigidity [GPa] | 37 | 38 | Unmeasured |
| Poissons ratio | 0.23 | 0.22 | Unmeasured |
| Appearance | Colorless | Colorless | Colorless |

TABLE 2

|  |  | No. 4 | No. 5 | No. 6 |
|---|---|---|---|---|
| Composition [wt %] | SiO$_2$ | 65.2 | 63.6 | 66.2 |
|  | Al$_2$O$_3$ | 22 | 22.5 | 23 |
|  | Li$_2$O | 3.7 | 4 | 2.7 |
|  | HfO$_2$ | 0.01 | 0.05 | 0.1 |
|  | Ta$_2$O$_5$ | 3.1 | 2.2 | 0 |
|  | Na$_2$O | 0.7 | 1.5 | 0.4 |
|  | K$_2$O | 0.3 | 0.1 | 0.3 |
|  | MgO | 0.7 | 1.1 | 0.7 |
|  | CaO | 0 | 0 | 0 |
|  | SrO | 0 | 0 | 0 |
|  | BaO | 1 | 0.4 | 1 |
|  | TiO$_2$ | 0 | 0 | 0 |
|  | ZrO$_2$ | 2.1 | 2.9 | 4.5 |
|  | P$_2$O$_5$ | 0.8 | 0.5 | 0.5 |
|  | SnO$_2$ | 0.4 | 1.1 | 0.6 |
|  | Fe$_2$O$_3$ | 0.015 | 0.015 | 0.015 |
| Transmittance [%] at thickness of 3 mm and wavelength of 300 nm |  | Unmeasured | Unmeasured | Unmeasured |
| Precipitated crystal |  | β-quartz solid solution | β-quartz solid solution | β-quartz solid solution |
| Thermal expansion coefficient at 30° C. to 380° C. [×10$^{-7}$/° C.] |  | Unmeasured | Unmeasured | Unmeasured |
| Thermal expansion coefficient at 30° C. to 750° C. [×10$^{-7}$/° C.] |  | Unmeasured | Unmeasured | Unmeasured |
| Youngs modulus [GPa] |  | Unmeasured | 92 | Unmeasured |
| Rigidity [GPa] |  | Unmeasured | 37 | Unmeasured |
| Poissons ratio |  | Unmeasured | 0.23 | Unmeasured |
| Appearance |  | Colorless | Colorless | Colorless |

TABLE 3

|  |  | No. 7 | No. 8 | No. 9 |
|---|---|---|---|---|
| Composition [wt %] | SiO$_2$ | 62.2 | 62.2 | 61.2 |
|  | Al$_2$O$_3$ | 22.6 | 23.1 | 23 |
|  | Li$_2$O | 2.5 | 3.2 | 4.5 |
|  | HfO$_2$ | 0.5 | 1 | 0.05 |
|  | Ta$_2$O$_5$ | 4.5 | 0 | 1 |
|  | Na$_2$O | 0.4 | 0.8 | 0.4 |
|  | K$_2$O | 0.8 | 0.3 | 0.3 |
|  | MgO | 0 | 0.7 | 1.2 |
|  | CaO | 0 | 0.9 | 0 |
|  | SrO | 0 | 0.5 | 1.6 |
|  | BaO | 2 | 0 | 1.2 |
|  | TiO$_2$ | 0.2 | 0 | 0.02 |
|  | ZrO$_2$ | 2.5 | 3.8 | 3 |

TABLE 3-continued

|  | No. 7 | No. 8 | No. 9 |
|---|---|---|---|
| P$_2$O$_5$ | 1.6 | 3.2 | 1.8 |
| SnO$_2$ | 0.2 | 0.3 | 0.7 |
| Fe$_2$O$_3$ | 0.015 | 0.015 | 0.015 |
| Transmittance [%] at thickness of 3 mm and wavelength of 300 nm | Unmeasured | Unmeasured | Unmeasured |
| Precipitated crystal | β-quartz solid solution | β-quartz solid solution | β-quartz solid solution |
| Thermal expansion coefficient at 30° C. to 380° C. [×10$^{-7}$/° C.] | Unmeasured | Unmeasured | Unmeasured |
| Thermal expansion coefficient at 30° C. to 750° C. [×10$^{-7}$/° C.] | Unmeasured | Unmeasured | Unmeasured |
| Youngs modulus [GPa] | Unmeasured | Unmeasured | Unmeasured |
| Rigidity [GPa] | Unmeasured | Unmeasured | Unmeasured |
| Poissons ratio | Unmeasured | Unmeasured | Unmeasured |
| Appearance | Colorless | Colorless | Colorless |

TABLE 4

|  |  | No. 10 |
|---|---|---|
| Composition [wt %] | SiO$_2$ | 66.7 |
|  | Al$_2$O$_3$ | 22.2 |
|  | Li$_2$O | 3.7 |
|  | HfO$_2$ | 0 |
|  | Ta$_2$O$_5$ | 0 |
|  | Na$_2$O | 0.4 |
|  | K$_2$O | 0.3 |
|  | MgO | 0.7 |
|  | CaO | 0 |
|  | SrO | 0 |
|  | BaO | 1.2 |
|  | TiO$_2$ | 1.8 |
|  | ZrO$_2$ | 2.8 |
|  | P$_2$O$_5$ | 0 |
|  | SnO$_2$ | 0.2 |
|  | Fe$_2$O$_3$ | 0.015 |
| Transmittance [%] at thickness of 3 mm and wavelength of 300 nm |  | 0 |
| Precipitated crystal |  | β-quartz solid solution |
| Thermal expansion coefficient at 30° C. to 380° C. [×10$^{-7}$/° C.] |  | −1.3 |
| Thermal expansion coefficient at 30° C. to 750° C. [×10$^{-7}$/° C.] |  | 1.3 |
| Youngs modulus [GPa] |  | 92 |
| Rigidity [GPa] |  | 38 |
| Poissons ratio |  | 0.21 |
| Appearance |  | Yellow |

First, each raw material was mixed in the form of oxide, hydroxide, carbonate, nitrate or the like so as to obtain a glass having the compositions shown in Tables 1 to 4, and a glass batch was obtained. The obtained glass batch was charged into a crucible made of reinforced platinum and was melted at 1,680° C. for 20 hours. After melting, the glass was rolled to a thickness of 4 mm and further cooled to room temperature using a slow cooling furnace to obtain a crystallizable glass.

The crystallizable glass was subjected to a heat treatment at 750° C. to 900° C. for 1.5 hours to form nuclei, and then further subjected to a heat treatment at 800° C. to 1,000° C. for 4 hours to be crystallized. The obtained crystallized glass was evaluated for the transmittance, the precipitated crystal, the thermal expansion coefficient, the Youngs modulus, the rigidity, the Poissons ratio, and the appearance.

The transmittance was evaluated by a transmittance at a wavelength of 300 nm measured with a spectrophotometer for a crystallized glass plate whose two sides were optically polished to a wall thickness of 3 mm. A spectrophotometer V-670 manufactured by JASCO Corporation was used in the measurement.

The precipitated crystal was evaluated using an X-ray diffractometer (fully automatic multipurpose horizontal X-ray diffractometer Smart Lab, manufactured by Rigaku Corporation).

The thermal expansion coefficient was evaluated by an average linear thermal expansion coefficient measured in the temperature ranges of 30° C. to 380° C. and 30° C. to 750° C. using a crystallized glass sample processed to 20 mm×3.8 mm (diameter). Diatometer manufactured by NETZSCH was used in the measurement.

The Youngs modulus, the rigidity, and the Poissons ratio were measured in a room temperature environment using a free resonance type elastic modulus measuring device for a plate-shaped sample (40 mm×20 mm×20 mm) whose surface was polished with a polishing solution in which No. 1200 alumina powder was dispersed.

The appearance was evaluated by visually confirming the color tone of the crystallized glass.

As is clear from Tables 1 and 2, the crystallized glasses of sample Nos. 1 to 9, which are Examples, have a colorless appearance, high transmittance, and a thermal expansion coefficient of almost 0. It is also found that Youngs modulus, the rigidity, and the Poissons ratio are desired values and the crystallized glasses are not easily broken. The crystallized glass of sample No. 10, which is Comparative Example, has a yellow appearance and a low transmittance of 0%, and has an absolute value of the thermal expansion coefficient larger than that of Examples.

INDUSTRIAL APPLICABILITY

The $Li_2O$—$Al_2O_3$—$SiO_2$-based crystallized glass according to the present invention is suitable for front windows of oil stoves or wood stoves, substrates for high-tech products such as substrates for color filters and image sensors, setters for firing electronic components, light diffusers, core tubes for semiconductor manufacturing, semiconductor manufacturing masks, optical lenses, dimensional measurement members, communication members, building members, chemical reaction containers, top plates for electromagnetic cooking, and window glass for fire doors.

The invention claimed is:

1. A $Li_2O$—$Al_2O_3$—$SiO_2$-based crystallized glass comprising: in a mass basis, $SnO_2$: 0.01% to 5%; $HfO_2+Ta_2O_5$: 0.01% to 10%; $HfO_2$: 0.01% to 10%, ZnO: 0% to 0.6%; $TiO_2$: 0% to 2%; and $Fe_2O_3$: 0.001% to 0.03%,
   wherein a β-quartz solid solution is precipitated as a main crystal, and
   wherein a transmittance thereof at a thickness of 3 mm and a wavelength of 300 nm is 10% or more.

2. The $Li_2O$—$Al_2O_3$—$SiO_2$-based crystallized glass according to claim 1, further comprising: in a mass basis, $SiO_2$: 40% to 90%; $Al_2O_3$: 5% to 30%; $Li_2O$: 1% to 10%; and $HfO_2+Ta_2O_5$: 0.01% to 10%.

3. The $Li_2O$—$Al_2O_3$—$SiO_2$-based crystallized glass according to claim 1, further comprising: in a mass basis, $SiO_2$: 40% to 90%; $Al_2O_3$: 5% to 30%; $Li_2O$: 1% to 10%; and $HfO_2+Ta_2O_5$: 0.05% to 10%.

4. The $Li_2O$—$Al_2O_3$—$SiO_2$-based crystallized glass according to claim 1, further comprising: in a mass basis, $Na_2O$: 0% to 10%; $K_2O$: 0% to 10%; MgO: 0% to 10%; CaO: 0% to 10%; SrO: 0% to 10%; BaO: 0% to 10%; $P_2O_5$: 0% to 5%; and $ZrO_2$: 0% to 10%.

5. The $Li_2O$—$Al_2O_3$—$SiO_2$-based crystallized glass according to claim 1, wherein an appearance thereof is colorless and transparent.

6. The $Li_2O$—$Al_2O_3$—$SiO_2$-based crystallized glass according to claim 1, wherein a thermal expansion coefficient thereof at 30° C. to 380° C. is $20×10^{-7}$/° C. or less.

7. The $Li_2O$—$Al_2O_3$—$SiO_2$-based crystallized glass according to claim 1, wherein a thermal expansion coefficient thereof at 30° C. to 750° C. is $25×10^{-7}$/° C. or less.

8. The $Li_2O$—$Al_2O_3$—$SiO_2$-based crystallized glass according to claim 2, further comprising: in a mass basis, $SiO_2$: 40% to 90%; $Al_2O_3$: 5% to 30%; $Li_2O$: 1% to 10%; and $HfO_2+Ta_2O_5$: 0.05% to 10%.

9. The $Li_2O$—$Al_2O_3$—$SiO_2$-based crystallized glass according to claim 2, further comprising: in a mass basis, $Na_2O$: 0% to 10%; $K_2O$: 0% to 10%; MgO: 0% to 10%; CaO: 0% to 10%; SrO: 0% to 10%; BaO: 0% to 10%; $P_2O_5$: 0% to 5%; and $ZrO_2$: 0% to 10%.

10. The $Li_2O$—$Al_2O_3$—$SiO_2$-based crystallized glass according to claim 3, further comprising: in a mass basis, $Na_2O$: 0% to 10%; $K_2O$: 0% to 10%; MgO: 0% to 10%; CaO: 0% to 10%; SrO: 0% to 10%; BaO: 0% to 10%; $P_2O_5$: 0% to 5%; and $ZrO_2$: 0% to 10%.

11. The $Li_2O$—$Al_2O_3$—$SiO_2$-based crystallized glass according to claim 8, further comprising: in a mass basis, $Na_2O$: 0% to 10%; $K_2O$: 0% to 10%; MgO: 0% to 10%; CaO: 0% to 10%; SrO: 0% to 10%; BaO: 0% to 10%; $P_2O_5$: 0% to 5%; and $ZrO_2$: 0% to 10%.

12. The $Li_2O$—$Al_2O_3$—$SiO_2$-based crystallized glass according to claim 2, wherein an appearance thereof is colorless and transparent.

13. The $Li_2O$—$Al_2O_3$—$SiO_2$-based crystallized glass according to claim 3, wherein an appearance thereof is colorless and transparent.

14. The $Li_2O$—$Al_2O_3$—$SiO_2$-based crystallized glass according to claim 2, wherein a thermal expansion coefficient thereof at 30° C. to 380° C. is $20×10^{-7}$/° C. or less.

15. The $Li_2O$—$Al_2O_3$—$SiO_2$-based crystallized glass according to claim 2, wherein a thermal expansion coefficient thereof at 30° C. to 750° C. is $25×10^{-7}$/° C. or less.

\* \* \* \* \*